United States Patent [19]

Lawson

[11] 3,795,312
[45] Mar. 5, 1974

[54] FILTER HEAD
[76] Inventor: Joseph M. Lawson, 4334 Woodcrest Dr., Memphis, Tenn. 38111
[22] Filed: Sept. 15, 1972
[21] Appl. No.: 289,677

[52] U.S. Cl................. 210/134, 210/136, 210/167, 137/512
[51] Int. Cl........................................... B01d 27/10
[58] Field of Search... 210/130, 133, 134, 136, 167, 210/428; 137/512

[56] References Cited
UNITED STATES PATENTS
2,108,798   2/1938   Dalrymple ...................... 210/136 X
3,667,603   6/1972   Courson.......................... 210/167 X
3,322,281   5/1967   Gulick ............................... 210/134

Primary Examiner—Samih N. Zaharna
Assistant Examiner—Robert G. Mukai
Attorney, Agent, or Firm—John R. Walker, III

[57] ABSTRACT

In a closed loop hydraulic circuit, a filter head which, depending on direction of flow, allows fluid from a first flow line to pass through a filter element while allowing fluid from a second flow line to bypass the filter element. The filter head includes a first chamber for receiving fluid from the first flow line, a second chamber for receiving fluid from the second flow line, and an intermediate chamber for receiving fluid from either the first or second chambers depending on direction of flow and for allowing the fluid to pass through a filter element. First and second sliding check valves are provided in the first and second chambers for allowing fluid from one of the flow lines to pass into the intermediate chamber and through the filter element while allowing fluid from the other flow line to bypass the intermediate chamber and the filter element.

8 Claims, 6 Drawing Figures 3,795,312

FILTER HEAD

BACKGROUND OF THE INVENTION

1. Field of the Invention

This invention relates generally to closed loop hydraulic circuits, and, more specifically, to filter heads for use in closed loop hydraulic circuits.

2. Description of the Prior Art

The general practice for filtration of closed loop hydraulic circuits at the present time is by conventional high pressure filters installed on each of the flow lines with a bypass properly equipped with check valves to prevent back flushing of the filters. Recently a filter head (Fairey type No. 822) has been introduced that is adapted to be installed on each of the flow lines and allows the fluid to pass through the filter element when flow is in one direction and allows the fluid to bypass the filter element when flow is reversed.

SUMMARY OF THE INVENTION

The present invention is directed towards overcoming the problems and disadvantages in previous filter heads for use in closed loop hydraulic circuits. The concept of the present invention is to provide a filter head that allows both flow lines to use one filter element regardless of the direction of flow through the lines. This allows the fluid that is flowing towards the fluid flow producing means to pass through the filter element and simultaneously allows fluid that is flowing away from the fluid flow producing means to bypass the filter element, thereby protecting the fluid flow producing means. Or, if desired, the filter head may be reversed to protect the hydraulic activated means. In addition, the present invention allows a means for preventing excessive pressure to build up without removing fluid from the system and allows fluid to be introduced into the circuit. The present invention allows the above features while maintaining plumbing to a minimum.

The filter head of the present invention generally includes a body portion having a first chamber for receiving hydraulic fluid from a first flow line, a second chamber for receiving hydraulic fluid from a second flow line, and an intermediate chamber for receiving hydraulic fluid from the first and second chambers and for passing the fluid through a filter. First and second sliding check valves are provided in the first and second chambers, respectively, for selectively allowing fluid from one of the chambers to pass into the intermediate chamber while allowing fluid from the other chamber to bypass the intermediate chamber.

DESCRIPTION OF THE PREFERRED EMBODIMENT

Figure 1:
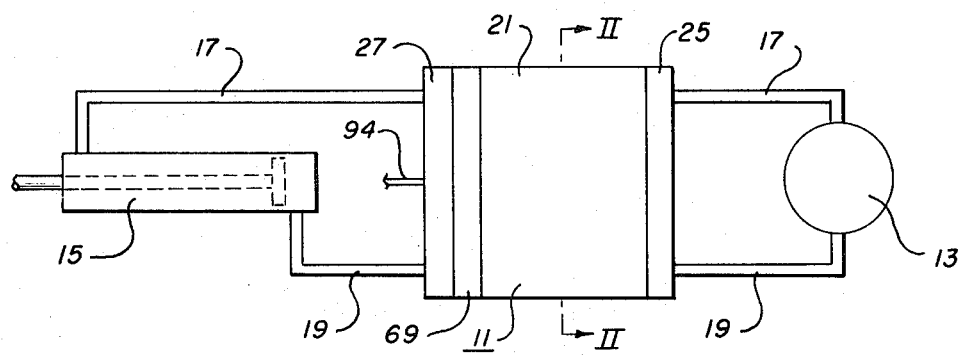
FIG. 1 is a diagrammatic view of a closed loop hydraulic circuit including the filter head of the present invention.
Figure 2:
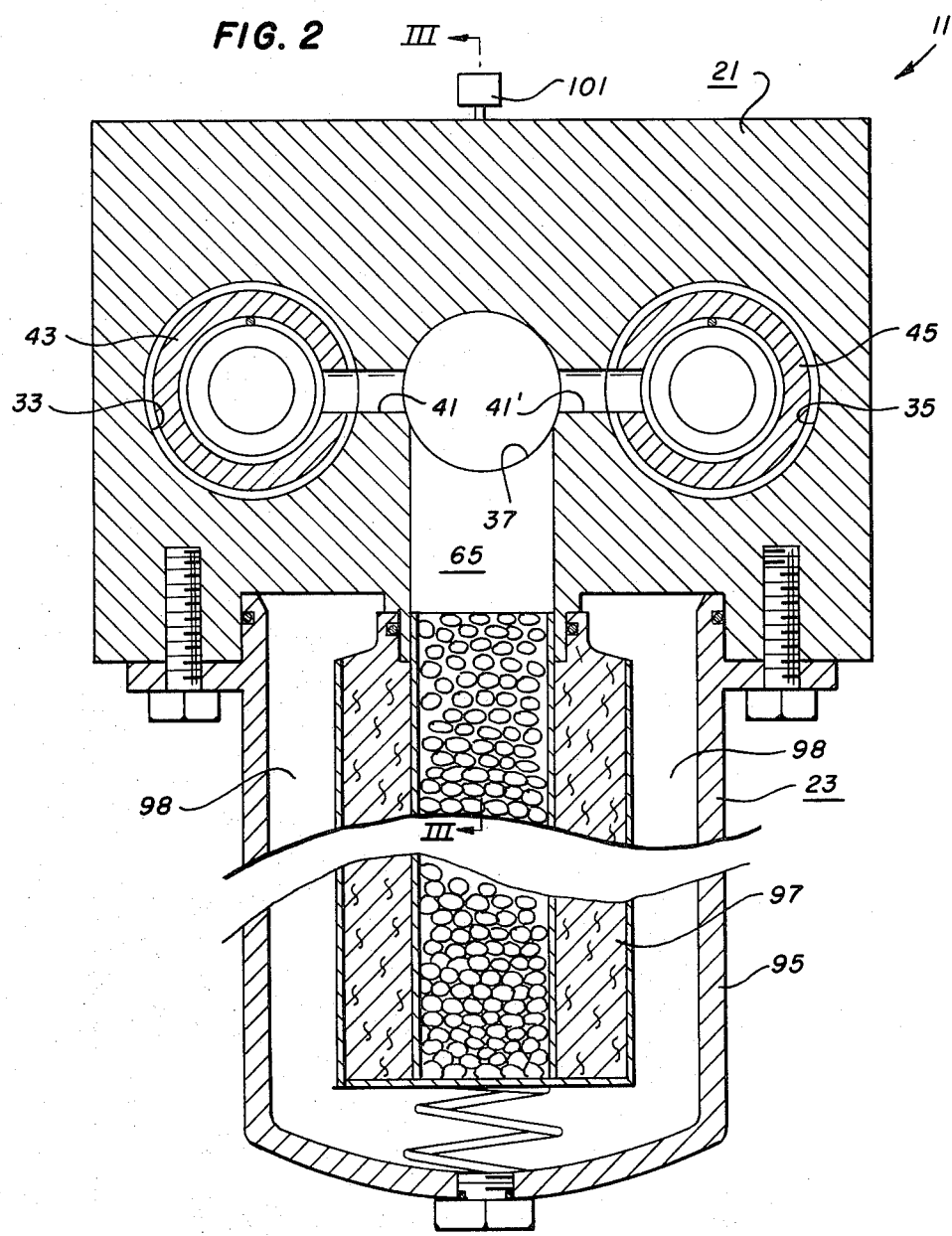
FIG. 2 is a sectional view of the filter head taken as on line II—II of FIG. 1.
Figure 3:
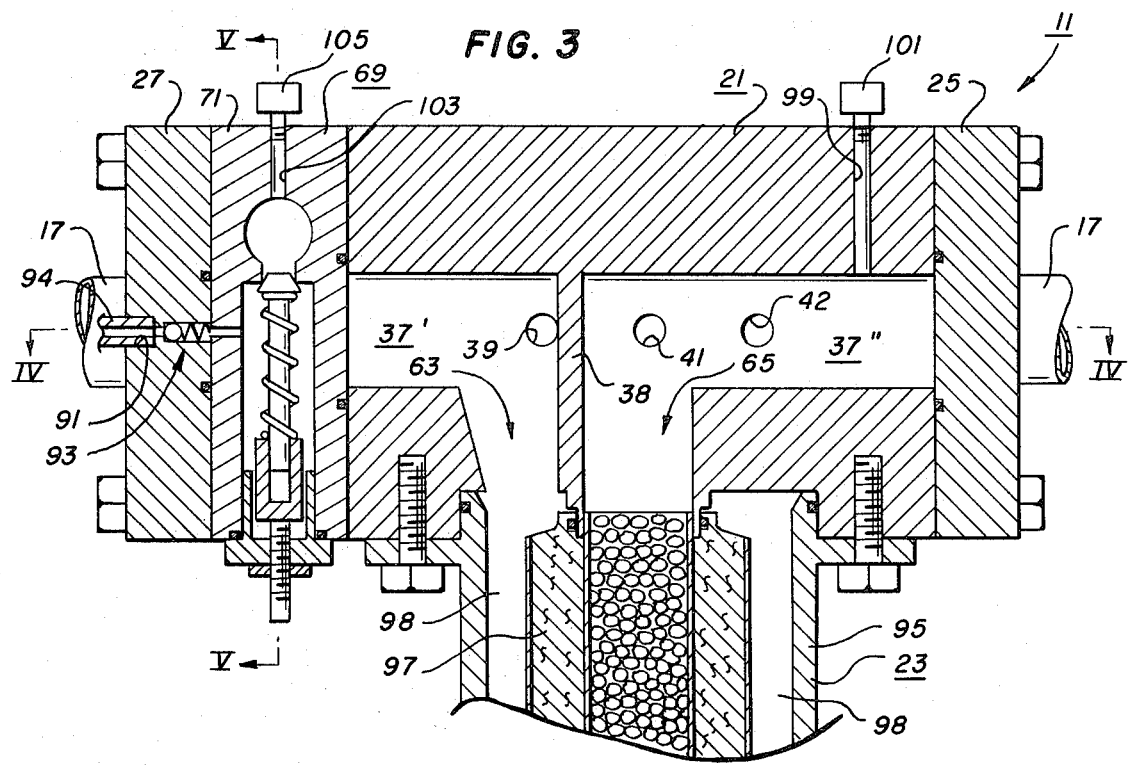
FIG. 3 is a sectional view of the filter head taken as on line III—III of FIG. 2.

The filter head 11 of the present invention is adapted for use in a closed loop hydraulic circuit (see FIG. 1) having a hydraulic fluid flow producing means, such as hydraulic pump 13, and a hydraulic activated mechanism 15 connected to each other by first flow line 17 and second flow line 19. Pump 13 is reversible to cause flow in opposite directions. The filter head 11 is connected to the first flow line 17 and the second flow line 19 intermediate the hydraulic pump 13 and the hydraulic activated mechanism 15.

The filter head 11 includes a body portion 21 and a filter portion 23. A first end plate 25 and a second end plate 27 are attached to opposite ends of the body portion 21. The first and second end plates 25, 27 have first openings 29 for attachment to the first flow line 17 and second openings 31 for attachment to the second flow line 19. The body portion 21 includes a first chamber 33, a second chamber 35, and an intermediate chamber 37, which is separated into two portions 37' and 37'' by a partition 38. The first chamber 33 is aligned with the first openings 29 in the first and second end plates 25, 27 and receives hydraulic fluid from the first flow line 17. The second chamber 35 is aligned with the second openings 31 in the first and second end plates 25, 27 and receives hydraulic fluid from the second flow line 19. A first port 39 is provided between the intermediate chamber portion 37' and the first chamber 33 for allowing hydraulic fluid to enter the intermediate chamber portion 37' from the first chamber 33. Likewise, a first port 39' is provided between the intermediate chamber portion 37' and the second chamber 35 to allow hydraulic fluid to enter the intermediate chamber portion 37' from the second chamber 35. A second port 41 is provided between the intermediate chamber portion 37'' and the first chamber 33 for allowing hydraulic fluid to pass between the intermediate chamber portion 37'' and the first chamber 33. Likewise, a second port 41' is provided between the intermediate chamber portion 37'' and the second chamber 35 for allowing the hydraulic fluid to pass between the intermediate chamber portion 37'' and the second chamber 35. A third port 42 is provided between the intermediate chamber portion 37'' and the first chamber 33 for allowing hydraulic fluid to pass from the intermediate chamber portion 37'' into the first chamber 33. Likewise, a third port 42' is provided between the intermediate chamber portion 37'' and the second chamber 35 for allowing the hydraulic fluid to pass from the intermediate chamber portion 37'' into the second chamber 35. A first sliding check valve 43 is provided in the first chamber 33 for allowing fluid from the first flow line 17 to pass into the intermediate chamber portion 37' through the first port 39, through the filter portion 23, and back into the first chamber 33 through the second port 41 when flow in line 17 is towards the pump 13, for allowing the fluid to bypass the intermediate chamber 37 when flow in line 17 is away from the pump 13 and for allowing the fluid to pass into the intermediate chamber portion 37'' through the second port 41 and back into the first chamber 33 through the third port 42 without passing through the filter portion 23 when flow in line 17 is towards the pump 13 and when the pressure in the first chamber 33 has passed a certain point, as will be better understood in the description to follow later in the specification.

A second sliding check valve 45 is provided in the second chamber 35 for allowing fluid from the second flow line 19 to pass into the intermediate chamber portion 37' through the first port 39', through the filter portion 23, and back into the second chamber 35 through the second port 41' when flow in line 19 is towards the pump 13, for allowing the fluid to bypass the intermediate chamber 37 when flow is away from the pump 13 and for allowing the fluid to pass into the intermediate chamber portion 37'' through the second port 41' and back into the second chamber 35 through the third port 42' without passing through the filter portion 23 when flow in line 19 is towards the pump 13 and when the pressure in the first chamber 33 has passed a certain point, as will be better understood in the description to follow later in the specification.

The first sliding check valve 43 comprises a hollow housing portion 47 having a first port 49 and a second port 51. The housing portion 47 is slidable in the first chamber 33 from an open position in which the first and second ports 49, 51 are respectively aligned with the first and second ports 39, 41 between the respective intermediate chamber portions 37', 37'' and the first chamber 33, to a closed position in which the first and second ports 49, 51 are disaligned with the first and second ports 39, 41, and to a bypass position in which the first and the second ports 49, 51 are respectively aligned with the second and third ports 41, 42. A partition 53 is provided in the hollow housing portion 47 intermediate the first port 49 and the second port 51. An opening 55 is provided in the partition 53. A plug 57 is provided in the hollow housing portion 47 adjacent the opening 55 in the partition 53. The plug 57 has an open position away from the opening 55 in the partition 53 for allowing the hydraulic fluid to flow therethrough and has a closed position adjacent the opening 55 in the partition 53 for prohibiting the fluid from flowing therethrough. A first spring 59 is provided in the first sliding check valve 43 for biasing the housing portion 47 in the closed position. A second spring 61 is provided in the check valve 43 for biasing the plug 57 in the closed position. It will be understood that plug 57 acting in conjunction with spring 61 and opening 55 defines a check valve 58.

Likewise, the second sliding check valve 45 includes a hollow housing portion 47', a first port 49' in the housing portion 47', a second port 51' in the housing portion 47', a partition 53' in the housing portion 47' intermediate the first port 49' and the second port 51', an opening 55' in the partition 53', a plug 57' having an open position away from the opening 55' and having a closed position adjacent the opening 55', a first spring 59' for biasing the housing portion 47' in the closed position, and a second spring 61' for biasing the plug 57' in the closed position. It will be understood that plug 57' acting in conjunction with spring 61' and opening 55' defines a check valve 58'.

Figure 4:
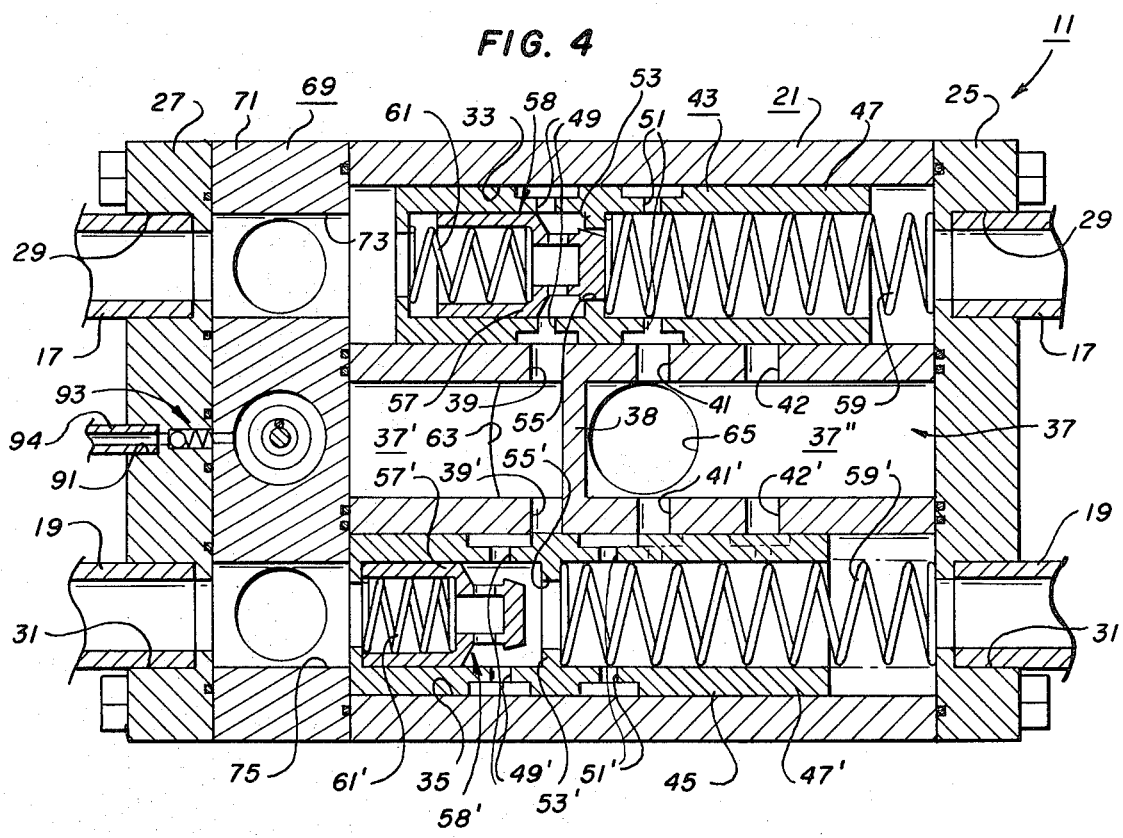
FIG. 4 is a sectional view of the filter head taken as on the line IV—IV of FIG. 3.
Figure 5:
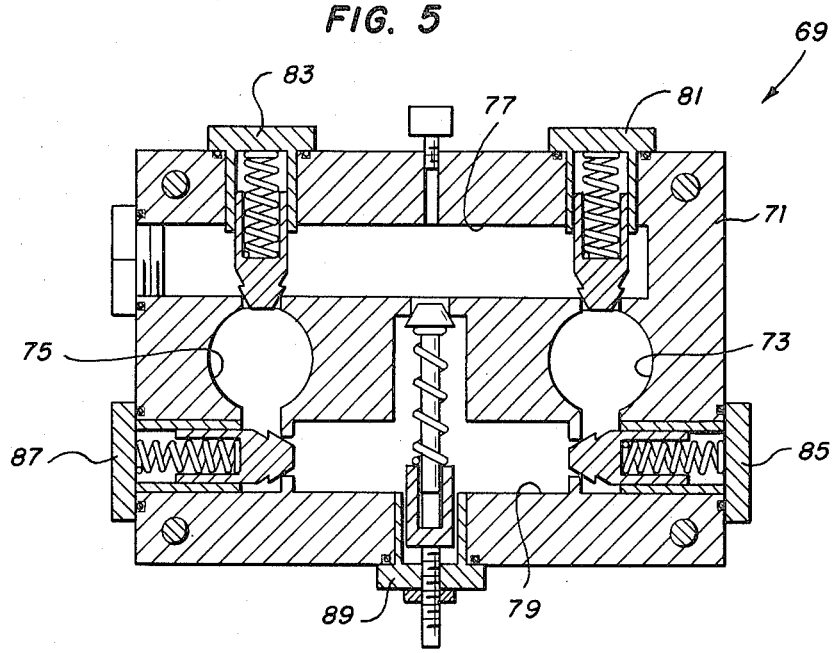
FIG. 5 is a sectional view of part of the filter head taken as on line V—V of FIG. 3.

Referring to FIG. 4, certain of the positions of check valves 58, 58' and check valves 43, 45, are shown, as follows: Check valve 43 is shown in the open position. Check valve 45 is shown in the closed position in solid lines and in the bypass position in broken lines. Check valve 58 is shown in the closed position and check valve 58' is shown in the open position. It will be understood that valves 58 and 58' have corresponding positions, and valves 43, 45 have corresponding positions, so that although all the positions are not shown, the positions not shown are the same as those shown for the opposite corresponding valve. For example, the closed position of valve 43 is like that shown for valve 45.

A first port 63 is provided between the intermediate chamber portion 37' and the filter portion 23 for allowing the fluid entering the intermediate chamber portion 37' from either of the first ports 39, 39' in either of the first or second chambers 33, 35 to flow into the filter portion 23 and the intermediate chamber portion 37'' for allowing the fluid in the filter portion 23 to flow into the intermediate chamber portion 37''. It will be understood that partition 38 divides intermediate chamber 37 and causes all of the hydraulic fluid entering the intermediate chamber from either of first ports 39, 39' to flow through the first port 63 and into the filter portion 23.

The filter head 11 may include a manifold means 69 intermediate the body portion 21 and the second end plate 27. The manifold means 69 includes a shell portion 71 having a first chamber 73 and a second chamber 75. The first chamber 73 is aligned with the first opening 29 in the second end plate 27 and with the first chamber 33 in the body portion 21. The second chamber 75 is aligned with the second opening 31 in the second end plate 27 and with the second chamber 35 in the body portion 21. A high pressure chamber 77 is provided in the manifold means 69 for receiving hydraulic fluid from either of the first or second chambers 73, 75 when the pressure in either of the first or second chambers 73, 75 exceeds that of chamber 77. A charge pressure chamber 79 is provided in the manifold 69 for allowing the injection of hydraulic fluid into the first and second chambers 73, 75 from a supply source outside the circuit.

A first check valve 81 is provided between the first chamber 73 and the high pressure chamber 77 for allowing the hydraulic fluid to pass from the first chamber 73 to the high pressure chamber 77 when the pressure in the first chamber 73 exceeds that of chamber 77. A second check valve 83 is provided between the second chamber 75 and the high pressure chamber 77 for allowing the hydraulic fluid to pass from the second chamber 75 to the high pressure chamber 77 when the pressure in the second chamber 75 exceeds that of chamber 77. Third and fourth check valves 85, 87 are provided between the first and second chambers 73, 75 and the charge pressure chamber 79 for allowing hydraulic fluid to pass from the charge pressure chamber 79 to the first and second chambers 73, 75 when the pressure in the charge pressure chamber 79 exceeds the pressure in either chambers 73 or 75. A relief valve 89 is provided between the high pressure chamber 77 and the charge pressure chamber 79 for allowing hydraulic fluid to pass from the high pressure chamber 77 to the charge pressure chamber 79 when the pressure in the high pressure chamber 77 exceeds the setting of the relief valve 89. It should be noted that when the manifold 69 is used with the filter head 11, the second end plate 27 is provided with an inlet 91 equipped with a check valve 93 and communicating with the charge pressure chamber 79 for allowing the injection of additional fluid to the charge pressure chamber 79. A supply line 94 is provided to the inlet 91 for supplying additional hydraulic fluid to the charge pressure chamber 79 from the supply source to make up for any loss in the system. When the pressure in chamber 77 exceeds the setting of relief valve 89, the fluid passes into the charge pressure chamber 79, thence to either chamber 73 or 75 through the respective check valves 85 or 87 depending on which has the lower pressure, i.e., the one which is being emptied. Thus, this creates a short circuit back to pump 13, bypassing the hydraulic activated mechanism 15.

The filter portion 23 includes a filter housing 95 and a filter element 97 well known to those skilled in the art. The filter housing 95 is attached to the body portion 21 adjacent the first and second ports 63, 65. The filter element 97 is positioned inside the filter housing 95 in such a manner so that hydraulic fluid entering the filter housing 95 through the first port 63 must pass through the filter element 97 in order to pass out the second port 65. More specifically, the filter element 97 is attached to the body portion 21 adjacent and surrounding the second port 65 of the intermediate chamber portion 37''. The filter housing 95 is attached to the body portion 21 adjacent and surrounding the first port 63 and adjacent and surrounding the filter element 97, thus creating an open chamber 98 between the filter housing 95 and the filter element 97, which chamber 98 communicates with first port 63.

The body portion 21 may be provided with a port 99 to the intermediate chamber portion 37'' and a gauge 101 or like instrument for indicating the pressure in the intermediate chamber portion 37''. Likewise, the manifold 69 may be provided with a port 103 to the high pressure chamber 77 and a gauge 105 or like instrument for indicating the pressure in the high pressure chamber 77. The filter portion 23 may be fitted with an indicator (not shown) in any manner known to those skilled in the art for showing when the filter element 97 needs replacing.

Figure 6:
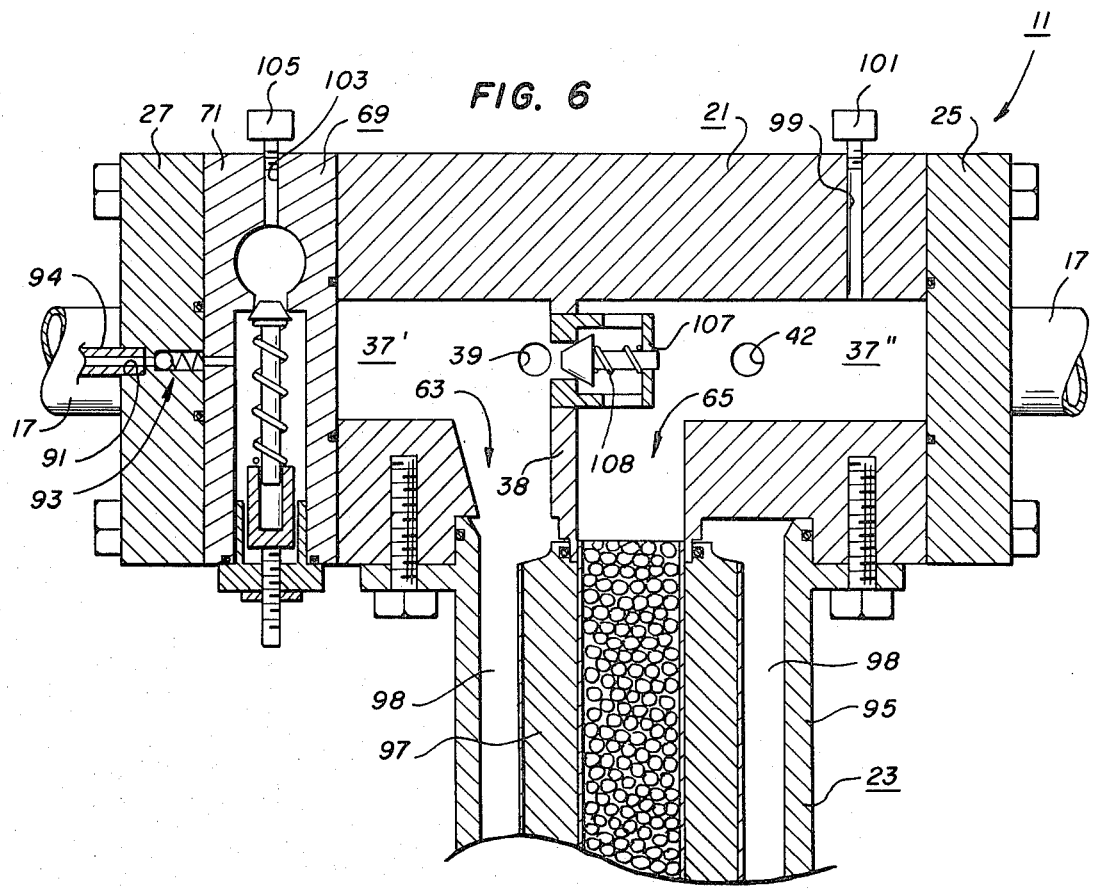
FIG. 6 is a sectional view of a part of the filter head showing an alternate embodiment thereof.

In some cases it may be desirable to omit the heretofore-mentioned bypass positions of values 43, 45, i.e., omit ports 42, 42', in which cases a bypass valve 107 is preferably provided in partition 38 between intermediate chamber portions 37' and 37'', as shown in FIG. 6. Thus, bypass valve 107 is actuated when the pressure differential between chamber portions 37' and 37'' exceeds the pressure of the spring 108 of bypass valve 107, as for example, when filter element 97 becomes clogged.

The body portion 21, filter portion 23, first end plate 25, second end plate 27 and manifold 69 are joined together in a manner well known to those skilled in the art, for example, by bolts. O-rings are provided throughout the filter head 11 to make it substantially leak-free.

In operation, when flow in the second flow line 19, for example, is from the pump 13, through the filter head 11, and to the hydraulic activated mechanism 15 and flow in the first flow line 17 is from the hydraulic activated mechanism 15, through the filter head 11, and to the pump 13, the hydraulic fluid from the second flow line 19 enters the second chamber 35 of the body portion 21 and forces the plug 57' to the left, as viewed in FIG. 4, to the open position. The hydraulic fluid is then allowed to pass through the second chamber 35, out of the filter head 11 and to the hydraulic activated mechanism 15. Conversely, the hydraulic fluid from the first flow line 17 enters the first chamber 33 of the body portion 21 and is forced into the intermediate chamber portion 37', through the filter portion 23, through chamber portion 37'', and back into the first chamber 33. The fluid is then forced out of the filter head 11 and to the pump 13.

On the other hand, when flow in the second flow line 19, for example, is from the hydraulic activated mechanism 15, through the filter head 11 and to the pump 13 and flow in the first flow line 17 is from the pump 13, through the filter head 11 and to the hydraulic activated mechanism 15, the hydraulic fluid from the second flow line 19 enters the second chamber 35 of the body portion 21 and is forced into the intermediate chamber portion 37', through the filter portion 23, and back into the second chamber 35. The fluid is then forced out of the filter head 11 and to the pump 13. Conversely, the hydraulic fluid from the first flow line 17 enters the first chamber 33 of the body portion 21, and forces the plug 57 to the open position. The hydraulic fluid is then allowed to pass through the first chamber 33, out of the filter head 11, and to the hydraulic activated mechanism 15.

It will be understood that the heretofore-described arrangement protects the pump 13, and if it is desired to protect the hydraulic activated mechanism 15, the filter head 11 should be reversed.

Although the invention has been described and illustrated with respect to a preferred embodiment thereof, it is not to be so limited since changes and modifications may be made therein which are within the full intended scope of the invention.

I claim:

1. A filter head for use in a closed loop hydraulic circuit having a hydraulic fluid flow producing means and a hydraulic activated mechanism connected to each other by first and second flow lines, said filter head comprising: a filter means; a body portion having a first chamber for receiving hydraulic fluid from the first flow line, a second chamber for receiving hydraulic fluid from the second flow line, and an intermediate chamber having ports to and from said first and second chambers for receiving hydraulic fluid therefrom and having ports to and from said filter means for passing hydraulic fluid therethrough; first sliding check valve means in said first chamber for allowing fluid from the first flow line to pass through a first of said ports between said intermediate chamber and said first chamber, through said filter means, and back into said first chamber through a second of said ports when flow in the first flow line is towards the fluid flow producing means, and for allowing the fluid to bypass said intermediate chamber when flow in the first flow line is away from the fluid flow producing means; and second sliding check valve means in said second chamber for allowing fluid from the second flow line to pass through a first of said ports between said intermediate chamber and said second chamber, through said filter means, and back into said second chamber through a second of said ports when flow in the second flow line is towards the fluid flow producing means, and for allowing the fluid to bypass said intermediate chamber when flow in the second flow line is away from the fluid flow producing means.

2. The filter head of claim 1 in which each of said first and second sliding check valve means comprises: a hollow housing portion having a first port and a second port, said housing portion being slidable from an open position in which said first and second ports are aligned with said first and second ports between either of said first and second chambers and said intermediate chamber to a closed position in which said first and second ports are disaligned with said first and second ports between either of said first and second chambers and said intermediate chamber, an open partition in said hollow housing portion intermediate said first and second ports, a plug means having an open position away from said open partition for allowing the fluid to flow therethrough and having a closed position adjacent said open partition for prohibiting the fluid from flowing therethrough, a first spring for biasing said housing portion in the closed position, and a second spring for biasing said plug means in the closed position.

3. The filter head of claim 2 which is provided with a third set of ports between said first and second chambers and said intermediate chamber and said hollow housing portion of either first or second sliding check valve means is slidable from said open and closed positions to a bypass position in which said first and second ports of said housing portion are aligned with said second and third ports between either of said first and second chambers and said intermediate chamber for allowing the hydraulic fluid to bypass said filter means when flow is towards the fluid flow producing means and when pressure in said first and second chambers has passed a certain point.

4. The filter head of claim 1 in which said intermediate chamber includes a closed partition between said port to said filter means and said port from said filter means for requiring all of the hydraulic fluid entering said intermediate chamber from said first of said ports between said intermediate chamber and either of said first and second chambers to flow through said filter means.

5. The filter head of claim 1 in which said intermediate chamber includes check valve means between said port to said filter means and said port from said filter means for allowing the hydraulic fluid entering said intermediate chamber from said first of said ports between said intermediate chamber and either of said first and second chambers to partially bypass said filter means when the pressure in said filter head has passed a certain point.

6. The filter head of claim 1 in which is included manifold means adjacent said body portion, said manifold means comprising: a shell portion having first and second chambers for receiving the hydraulic fluid from said first and second chambers of said body portion, a high pressure chamber for receiving the hydraulic fluid from either of said first or second chambers when the pressure in either of said first or second chambers passes a certain point, and a charge pressure chamber for allowing the injection of hydraulic fluid into said first and second chambers from a supply source outside the circuit; first check valve means between said first chamber and said high pressure chamber for allowing the hydraulic fluid to pass from said first chamber to said high pressure chamber when the pressure in said first chamber has passed a certain point; second check valve means between said second chamber and said high pressure chamber for allowing the hydraulic fluid to pass from said second chamber to said high pressure chamber when the pressure in said second chamber has passed a certain point; third and fourth check valve means between said first and second chambers and said charge pressure chamber for allowing hydraulic fluid to pass from said charge pressure chamber to said first and second chambers when the pressure in said charge pressure chamber has passed a certain point; and fifth check valve means between said high pressure chamber and said charge pressure chamber for allowing the hydraulic fluid to pass from said high pressure chamber to said charge pressure chamber when the pressure in said high pressure chamber has passed a certain point.

7. A filter head for use in a closed loop hydraulic circuit having a hydraulic fluid flow producing means and a hydraulic activated mechanism connected to each other by first and second flow lines, said filter head comprising: a filter means; a body portion having a first chamber for receiving hydraulic fluid from the first flow line, and an intermediate chamber having ports to and from said first and second chambers for receiving hydraulic fluid therefrom and having ports to and from said filter means for passing hydraulic fluid therethrough, said intermediate chamber including a closed partition between said ports to and from said filter means for requiring all of the hydraulic fluid entering said intermediate chamber from a first of said ports between said intermediate chamber and said first chamber and from a first of said ports between said intermediate chamber and said second chamber to flow through said filter means; first sliding check valve means in said first chamber for allowing fluid from the first flow line to pass through said first of said ports between said intermediate chamber and said first chamber, through said filter means, and back into said first chamber through a second of said ports when flow is towards the fluid flow producing means, for allowing the fluid to pass into said intermediate chamber through said second of said ports between said intermediate chamber and said first chamber and back into said first chamber through a third of said ports when flow is toards the fluid flow producing means and when pressure in said first chamber has passed a certain point, and for allowing the fluid to bypass said intermediate chamber when flow is away from the fluid flow producing means; second sliding check valve means in said second chamber for allowing fluid from the second flow line to pass through said first of said ports between said intermediate chamber and said second chamber, through said filter means, and back into said second chamber through a second of said ports when flow is toward the fluid flow producing means, for allowing the fluid to pass into said intermediate chamber through said second of said ports between said intermediate chamber and said second chamber and back into said second chamber through a third of said ports when flow is towards the fluid flow producing means and when pressure in said second chamber has passed a certain point, and for allowing the fluid to bypass said intermediate chamber when flow is away from the fluid flow producing means; and manifold means adjacent said body portion, said manifold means having first and second chambers for receiving the hydraulic fluid from said first and second chambers of said body portion, a high pressure chamber for receiving the hydraulic fluid when the pressure in said first or second chamber passes a certain point, and a charge pressure chamber for allowing the injection of hydraulic fluid into said first and second chambers from a supply source outside the circuit.

8. The combination with a closed loop hydraulic circuit having a hydraulic fluid flow producing means and a hydraulic activated mechanism connected to each other by first and second flow lines of a filter head, said filter head comprising: a filter means; a body portion having a first chamber for receiving hydraulic fluid from the first flow line, a second chamber for receiving hydraulic fluid from the second flow line, and an intermediate chamber having ports to and from said first and second chambers for receiving hydraulic fluid therefrom and having ports to and from said filter means for passing hydraulic fluid therethrough, said intermediate chamber including a closed partition between said ports to and from said filter means for requiring all of the hydraulic fluid entering said intermediate chamber from a first of said ports between said intermediate chamber and said first chamber and from a first of said ports between said intermediate chamber and said second chamber to flow through said filter means; first sliding check valve means in said first chamber for allowing fluid from the first flow line to pass through said first of said ports between said intermediate chamber and said first chamber, through said filter means, and back into said first chamber through a second of said ports when flow is towards the fluid flow producing means, for allowing the fluid to pass into said intermediate chamber through said second of said ports between said intermediate chamber and said first chamber and back into said first chamber through a third of said ports when flow is towards the fluid flow producing means and when pressure in said first chamber has passed a certain point, and for allowing the fluid to bypass said intermediate chamber when flow is away from the fluid flow producing means; second sliding check valve means in said second chamber for allowing fluid from the second flow line to pass through said first of said ports between said intermediate chamber and said second chamber, through said filter means, and back into said second chamber through a second of said ports when flow is toward the fluid flow producing means, for allowing the fluid to pass into said intermediate chamber through said second of said ports between said intermediate chamber and said second chamber and back into said second chamber through a third of said ports when flow is towards the fluid flow producing means and when pressure in said second chamber has passed a certain point, and for allowing the fluid to bypass said intermediate chamber when flow is away from the fluid flow producing means; and manifold means adjacent said body portion, said manifold means having first and second chambers for receiving the hydraulic fluid from said first and second chambers of said body portion, a high pressure chamber for receiving the hydraulic fluid when the pressure in said first or second chamber passes a certain point, and a charge pressure chamber for allowing the injection of hydraulic fluid into said first and second chambers from a supply source outside the circuit.

* * * * *